(12) United States Patent
Sadakata

(10) Patent No.: US 6,574,850 B1
(45) Date of Patent: Jun. 10, 2003

(54) METHOD FOR MANUFACTURING SHOCK ABSORBING TYPE STEERING SHAFT

(75) Inventor: Kiyoshi Sadakata, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/518,673

(22) Filed: Mar. 3, 2000

(30) Foreign Application Priority Data

| Mar. 4, 1999 | (JP) | 11-056932 |
| May 19, 1999 | (JP) | 11-138640 |
| Feb. 29, 2000 | (JP) | 2000-053149 |

(51) Int. Cl.⁷ .................. B23P 19/02; B62D 1/11; F16L 35/00
(52) U.S. Cl. ................... 29/525; 29/505; 285/1; 280/777
(58) Field of Search .................. 29/505, 508, 515, 29/516, 517, 525; 280/777, 775; 285/1, 330; 403/274, 285

(56) References Cited

U.S. PATENT DOCUMENTS 5,623,756 A * 4/1997 Yanagidate et al. .......... 29/525

FOREIGN PATENT DOCUMENTS

| EP | 0 612 649 | 8/1994 |
| EP | 0 612 650 | 8/1994 |
| GB | 2 105 441 | 3/1983 |
| JP | 52-25330 | 2/1977 |
| JP | 1-58373 | 4/1989 |
| JP | 8-91230 | 4/1996 |
| JP | 9-272447 | 10/1997 |
| JP | 10-181615 | 7/1998 |

\* cited by examiner

Primary Examiner—John C. Hong
(74) Attorney, Agent, or Firm—Miles & Stockbridge P.C.

(57) ABSTRACT

A shock absorbing type steering shaft comprising a tubular outer shaft having a female serration and a solid inner shaft having a male serration. After the outer diameter surface of the outer shaft is pressed inwardly in the radial direction to plastically deform an inner portion thereof, the inner shaft is inserted into the outer shaft so that the inner shaft is pressure-contacted and fixed to the plastically deformed portion of the outer shaft.

1 Claim, 20 Drawing Sheets

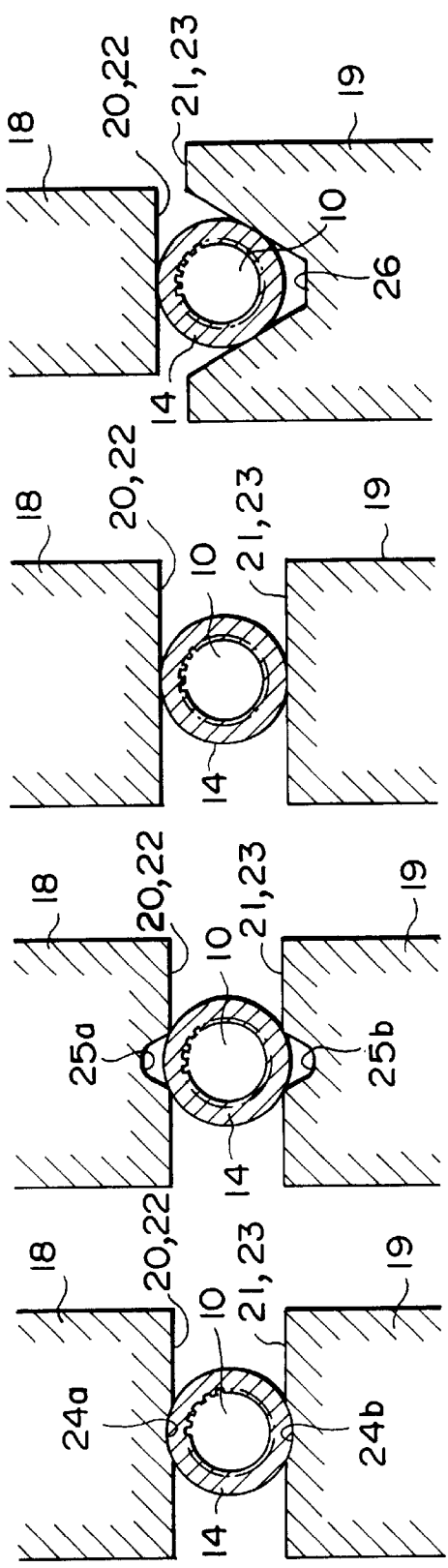

218a  219a

218b

219b

METHOD FOR MANUFACTURING SHOCK ABSORBING TYPE STEERING SHAFT

BACKGROUND OF THE INVENTION

1. Field of the Invention

The present invention relates to a shock absorbing type steering shaft which is capable of contracting in the axial direction upon collision of the car owing to the impact of the collision, and a method of manufacturing such steering shaft. Particularly, the present invention relates to a shock absorbing type steering shaft capable of stabilizing a collapse load which acts at the time of collision of the car even when the inner shaft of the car is a solid shaft so as to reduce the manufacturing cost, as well as a method of manufacturing such steering shaft.

2. Related Background Art

In a steering apparatus for a car, there is provided a shock absorbing type steering shaft which can be contracted in the axial direction upon collision, by the impact of the collision.

An example of a method for manufacturing such shock absorbing type steering shaft is disclosed in Japanese Patent Application Laid-Open No. 52-25330, in which a solid inner shaft having a non-circular cross section in a substantially oval form is inserted into a tubular outer shaft having a non-circular cross section in a substantially oval form, the outer shaft is pressed by a pressing member inwardly from the outer side thereof in the radial direction to plastically deform the both shafts locally, and then both the shafts are pressure-fixed to each other elastically by the portions thus plastically deformed. In this manner, while a relative movement between the both shafts in the axial direction is prevented normally, the plastically deformed portions are caused to collapse at the time of collision of the car, whereby the inner shaft is moved into the outer shaft to contract the entire length of the steering shaft, thereby absorbing the shock.

However, according to the manufacturing method disclosed above, since the plastic deforming is conducted in the state that the solid inner shaft is inserted in the outer shaft, an amount of plastic deformation of the outer shaft is not sufficient, so that there is a possibility of backlash in the pressure contact and fixation of both the shafts.

In Japanese Patent Application Laid-Open No. 1-58373, in the state that a jig is inserted in a tubular outer shaft having a circular cross section, the outer shaft is pressed inwardly in the radial direction by the pressing member from the outer side thereof, so that the outer shaft is plastically deformed locally to have a non-circular cross section. Subsequently, the jig is removed, and the solid inner shaft having a circular cross section is inserted into the outer shaft, whereby the inner shaft is pressure-fixed to the portion of the outer shaft which has been plastically deformed to the non-circular cross section.

However, according to the manufacturing method disclosed above, it is required to once insert the jig into the outer shaft and, after the plastic processing, to remove the jig. Thus, the manufacturing process becomes complicated for such steps of inserting and removing the jig and, as a result, the manufacturing cost is increased.

Further, in Japanese Patent Application Laid-Open No. 9-272447, an inward protrusion is formed in the radial direction on a tubular outer shaft having a circular cross section with a female serration, an annular recess from which a serration has been removed is formed on the outer peripheral surface of a solid inner shaft having a circular cross section with a male serration, and the annular recess of the inner shaft is caused to engage with the inward protrusion in the radial direction of this outer shaft in such a manner that the both shafts are pressure-contacted and fixed with pressure to each other.

However, according to the manufacturing method disclosed above, it is required to remove a part of the serration from the male serration formed on the outer peripheral surface of the inner shaft and to form the annular recess, which may result in an increase in the manufacturing cost.

Further, according to Japanese Patent Application Laid-Open. No. 10-181615 (which has been converted from an application for a Japanese Utility Model Registration filed in 1992), the tip end of a tubular outer shaft having a circular cross section and the tip end of a solid inner shaft having a circular cross section are plastically deformed to have non-circular (flat or elliptic) cross sections, respectively. On the other hand, inner portions other than the tip ends of the both shafts are maintained to have circular cross sections. Then, the inner shaft is inserted into the outer shaft, and the portion having the non-circular cross section of the outer shaft is strongly pressure-contacted and fixed to the portion having the circular cross section of the inner shaft and the portion having the circular cross section of the outer shaft is strongly pressure-contacted and fixed to the portion having the non-circular cross section of the inner shaft, respectively, whereby the both shafts are pressure-contacted and fixed to each other.

However, according to the manufacturing method disclosed above, the plastic deforming of the tip end of the outer shaft and the plastic deforming of the tip end of the inner shaft are conducted separately, so that the manufacturing process becomes complicated, which may bring about an increase in the manufacturing cost.

Further, in Japanese Patent Application Laid-Open No. 8-91230, like in Japanese Patent Application Laid-Open No. 10-181615, the tip end of the outer shaft and the tip end of the inner shaft are plastically deformed to have non-circular cross sections. However, as a step of this plastic deforming, the tip end of the inner shaft is inserted in the tip end of the outer shaft to be maintained in an overlapping state, and these both overlapping tip ends are pressed inwardly in the radial direction by the pressing members to be plastically deformed to have non-circular cross sections. Thus, the both tip ends are plastically deformed at a time to simplify the manufacturing process.

However, according to the manufacturing method disclosed above, the inner shaft is required to be hollow and, when the inner shaft is solid, even if the tip end of the solid inner shaft is inserted into the tip end of the tubular outer shaft and the both overlapping tip ends are pressed inwardly in the radial direction by the pressing members, the plastic deforming can not be conducted satisfactorily with respect to the solid inner shaft.

Further, according to Japanese Patent Application Laid-Open No. 10-147245, like in Japanese Patent Application Laid-Open No. 8-91230 mentioned above, the both tip ends are plastically deformed by the pressing members at a time in the state that the both tip ends of the outer shaft and the inner shaft overlap each other. It is further arranged to adjust the collapse load by adjusting the press load of the pressing members.

However, according to the manufacturing method disclosed above, like in Japanese Patent Application Laid-Open No. 8-91230, when the inner shaft is solid, the plastic deforming can not be conducted satisfactorily.

Incidentally, when the inner shaft is a solid shaft, it is comparatively difficult to plastically deform the both tip ends at a time in the state that the tip ends of the both shafts overlap each other, like Japanese Patent Application Laid-Open no. 8-91230. However, a part of the above Japanese Patent Application Laid-Open No. 8-91230 discloses a method for pressure-contacting and fixing the solid inner shaft and the tubular outer shaft to each other, as shown in FIG. 19.

A bottomed hole 103 is formed at the tip end 101a of the solid inner shaft 101 having a circular cross section with a male serration 102, and the tip end 101a of this inner shaft 101 is fitted in the tip end 104a of the tubular outer shaft 104 having a circular cross section with a female serration 105. These both overlapping tip ends 101a and 104a are pressed by the pressing members 106 and 106 from the upper and lower directions thereof so that the both tip ends 101a and 104a are plastically deformed to respectively have non-circular (flat or elliptic) cross sections, meanwhile the inner portions other than the tip ends of the both shafts 101 and 104 are maintained to have the circular cross sections.

After that, the pressing members 106 and 106 are removed and the inner shaft 101 is further inserted into the outer shaft 104, the tip end 101a of the non-circular cross section of the inner shaft 101 is strongly pressure-contacted and fixed to the inner portion of the circular cross section of the outer shaft 104, and the tip end 104a of the non-circular cross section of the outer shaft 104 is strongly pressure-contacted and fixed to the inner portion of the circular cross section of the inner shaft 101.

However, the drilling and processing works are required to form the bottomed hole 103 on the tip end 101a of the solid inner shaft 101, which may bring about an increase in the manufacturing cost.

While the outer shaft 104 is obtained by plastically deforming a tubular shaft, the inner shaft 101 is obtained by plastically deforming a solid shaft on which the bottomed hole 103 is drilled. Thus, the level of the plastic deforming is not always the same for the both shafts, and one of the shafts may be deformed excessively. As a result, the force of pressure-contact and fixation is different between the both shafts, so that it becomes difficult to stabilize the collapse load to act upon collision of the car.

SUMMARY OF THE INVENTION

The present invention has been conceived taking the circumstances mentioned above into consideration, and an object of the invention is to provide a shock absorbing type steering shaft which can stabilize a collapse load acting upon collision of the car and can reduce the manufacturing cost, as well as a method for manufacturing such steering shaft.

In order to achieve the above object, there is provided according to the present invention, a shock absorbing type steering shaft comprising a tubular outer shaft having a female serration and a solid inner shaft having a male serration, characterized in that:

after the outer diameter surface of the outer shaft is pressed inwardly in the radial direction to plastically deform an axially inner portion thereof, the inner shaft is inserted into the outer shaft so that the inner shaft is pressure-contacted and fixed to the plastically deformed portion of the outer shaft.

In order to achieve the above object, there is also provided according to the present invention a method for manufacturing a shock absorbing type steering shaft for fitting and fixing a solid inner shaft having a male serration in a tubular outer shaft having a female serration, comprising the steps of:

inserting the tip end of the inner shaft into the tip end of the outer shaft to hold the same in a state that these tip ends are overlapping each other;

pressing the outer shaft at which the both tip ends are not overlapping each other inwardly in the radial direction by means of a pressing member to plastically deform an axially inner portion thereof; and removing this pressing member to further insert the inner shaft into the outer shaft, thereby pressure-contacting and fixing the inner shaft to the plastically deformed portion of the outer shaft.

As describe above, according to the present invention, the tip end of the inner shaft is inserted into the tip end of the outer shaft to be maintained in an overlapping manner, the inner portion of the outer shaft is pressed inwardly in the radial direction by the pressing members and is plastically deformed, and the inner shaft is pressure-contacted to be fixed to this plastically deformed portion of the outer shaft. That is, the outer shaft is plastically deformed while preventing the outer tube from being excessively deformed, by plastically deforming the inner portion of the outer shaft in the state that the tip ends of the both shafts overlap each other slightly. Consequently, it is possible to stably maintain the force of pressure contact and fixation of the steering shaft in its accomplished state. It is also possible to stabilize a collapse load which acts at the time of collision of the car. In addition, since a drilling step is unnecessary, unlike in the conventional method, the manufacturing cost can be reduced.

According to another aspect of the present invention, there is provided a method for manufacturing a shock absorbing type steering shaft in which a solid inner shaft having a male serration is pressure-fitted in and fixed to a tubular outer shaft having the female serration, comprising the steps of:

pressing and deforming a predetermined portion of the tip end of the outer shaft from the outside thereof in the radial direction to form the female serration portion; and pressing and fitting the male serration portion of the inner shaft in this pressed and deformed portion to pressure-contact and fix the inner shaft thereto. There is also provided a shock absorbing type steering shaft which is manufactured by such method.

BRIEF DESCRIPTION OF THE DRAWINGS

FIGS. 2A to 2D are schematic cross sectional views, in which FIG. 2A shows a cross section taken along the line II—II in FIG. 1, and FIGS. 2B, 2C and 2D, respectively, show steps of the plastic deforming according to the variations.

DESCRIPTION OF THE PREFERRED EMBODIMENTS

Figure 6:
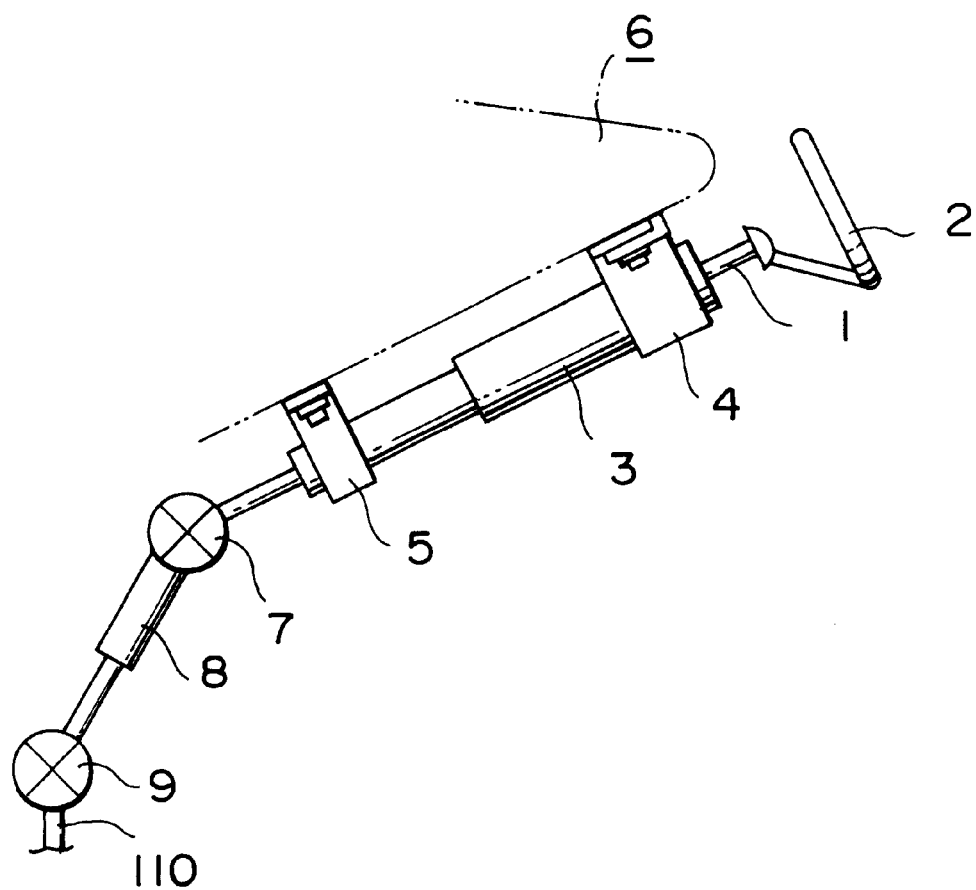
FIG. 6 is a schematic view of a steering mechanism in which the shock absorbing type steering shaft according to an embodiment of the present invention is assembled.

FIG. 6 is a schematic view of a steering mechanism for a steering apparatus of a car, in which a shock absorbing type steering shaft according to an embodiment of the present invention, which will be described later, is assembled. As shown in FIG. 6, a steering wheel 2 is fixed to the upper end of a steering shaft 1. A steering column 3 is fixed to the lower surface of an instrument panel 6 by means of upper and lower brackets 4 and 5. The first steering shaft 1 is inserted through inside this steering column 3 to be rotatable. A portion which is positioned at a lower end of the first steering shaft and is protruding from the lower end opening of the steering column 3 is coupled to the upper end portion of a second steering shaft 8 through a first universal joint 7. The lower end portion of this second steering shaft 8 is coupled to a third steering shaft 110 which leads to a steering gear (not shown) through a second universal joint 9.

With the constitution described above, a movement of the steering shaft 2 is transmitted to the steering gear through the first steering shaft 1 which is inserted through the steering column 3, the first universal joint 7, the second steering shaft 8, the second universal joint 9, and the third steering shaft 110. This steering gear gives a steering angle to the wheels in response to the movement of the steering wheel 2.

In this steering mechanism, either one or both of the steering shafts 1 and 8 have the forms in the following embodiment of the present invention.

Description will be made below on a shock absorbing type steering shaft and a method for manufacturing the same according to an embodiment of the present invention, with reference to the drawings.

Figure 1:
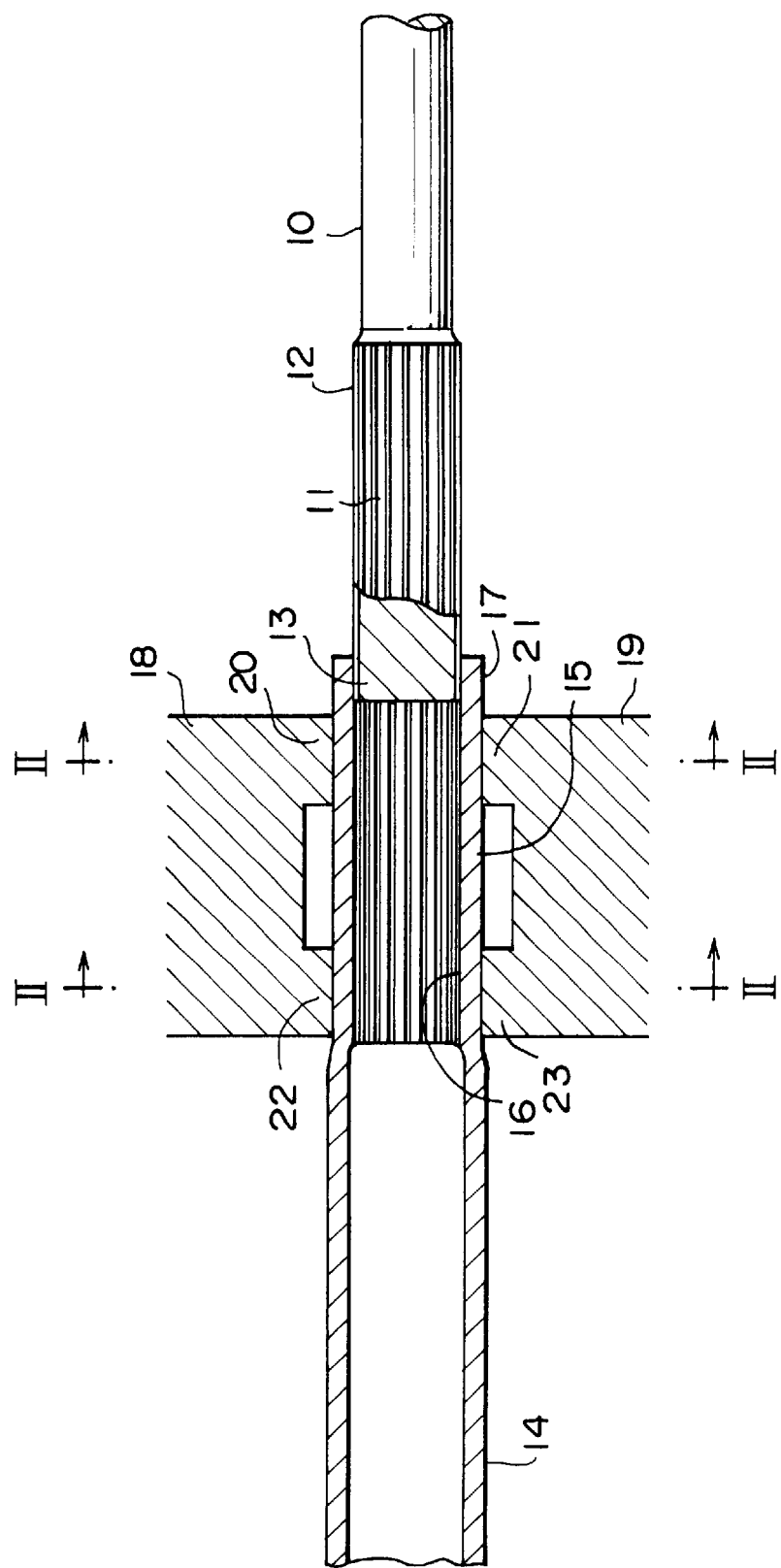
FIG. 1 is a schematic cross sectional view for showing a step of a method for manufacturing a shock absorbing type steering shaft according to the first embodiment of the present invention.

FIG. 1 is a schematic cross sectional view for showing a step of the method for manufacturing a shock absorbing type steering shaft according to a first embodiment of the present invention. FIG. 2A is a cross sectional view of the steering shaft, taken along the line II—II in FIG. 1, for showing a step of plastic deforming process. FIGS. 2B, 2C, and 2D are schematic cross sections for respectively showing steps of plastic deforming process according to variations of the embodiment.

As shown in FIG. 1, a large diameter portion 11 having a male serration 12 is formed on a solid inner shaft 10 having a circular cross section, while a small diameter portion 15 having a female serration 16 is formed on a tubular outer shaft 14 having a circular cross section. When a plastically deforming process which will be described later is conducted, the tip end 13 of the inner shaft 10 is inserted into the tip end 17 of the outer shaft 14 to be maintained in an overlapping manner.

A pair of pressing members 18 and 19 are disposed for plastically deforming the small diameter portion 15 of the outer shaft 14. These pressing members 18 and 19 are respectively provided with tip end side pressing portions 20 and 21 for plastically deforming the tip end sides of the small diameter portion 15 and rear side pressing portions 22 and 23 for plastically deforming the rear sides of the small diameter portion 15.

Figure 1A:
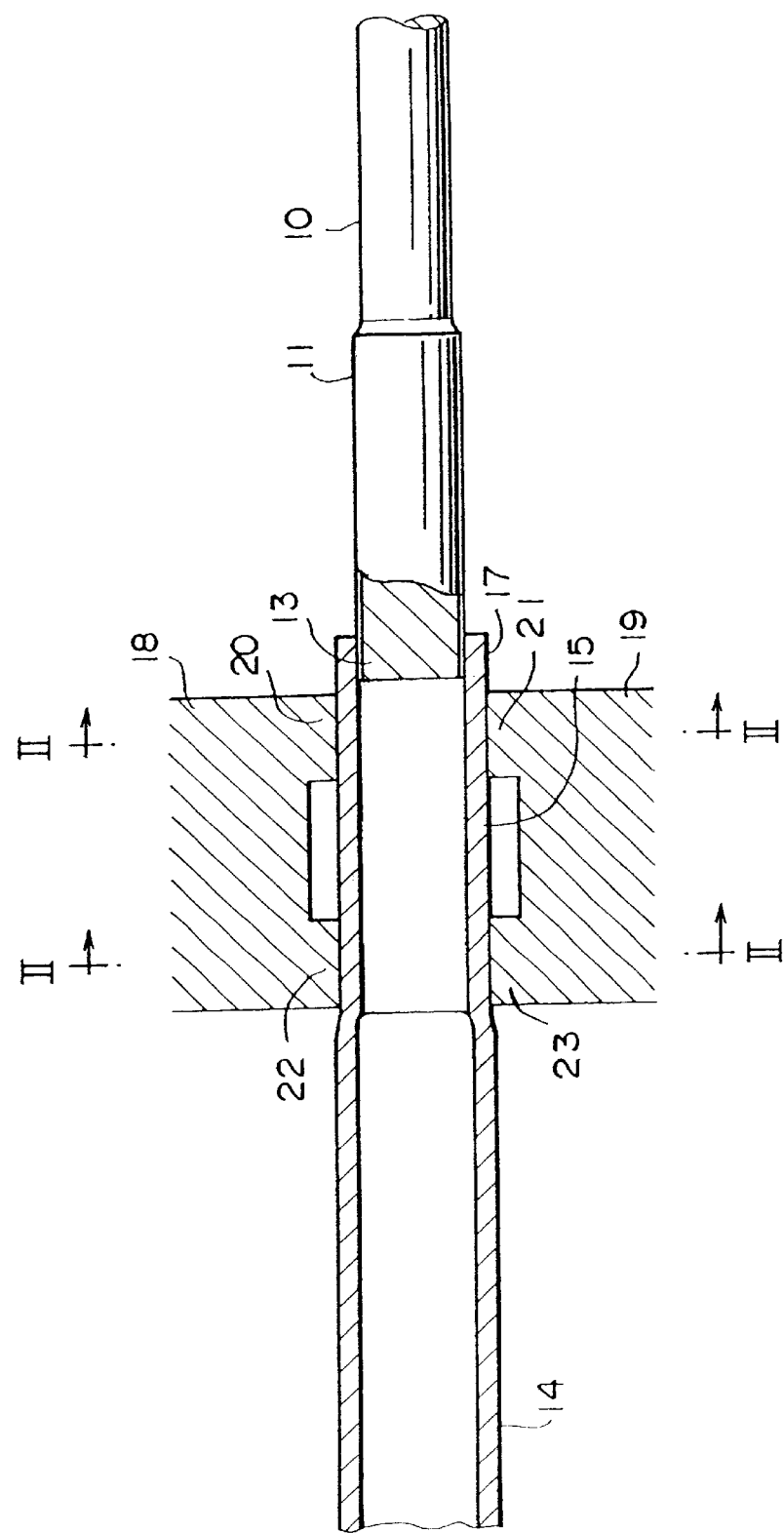
FIG. 1A is a schematic cross-sectional view similar to FIG. 1 but with the serrations 12 and 16 omitted for clarity of illustration.

FIG. 1A illustrates the insertion into a hollow tip end portion 17 of the tubular outer shaft member 14, a solid tip end portion 11 of the solid inner shaft member 10 that fills the hollow tip end portion of the tubular outer shaft member, so that the inner shaft member is held by and overlaps with the outer shaft member at the tip end portions thereof. As also shown In FIG. 1A, the outer shaft member 14 is pressed radially inwardly at positions thereof displaced from the overlapping tip end portions by means of pressing members 18 and 19, to deform plastically inner portions of the outer shaft member. For clarity of illustration the serrations 12 and 16 shown in FIG. 1 have been omitted.

As shown in FIG. 2A, arcuate pressing surfaces 24a and 24b are formed on the respective pressing portions 20 and 21; and 22 and 23 of the pressing members 18 and. 19.

Note that as variations of the pressing members 18 and 19, the pressing portions 20 to 23 may have deep grooves 25a and 25b each having a U-shaped cross section, as shown in FIG. 2B, so that the four edges of these deep grooves 25a and 25b may be used for pressing. Also, as shown in FIG. 2C, the pressing portions 20 to 23 may be formed to be entirely flat. Further, as shown in FIG. 2D, the pressing members 21 and 23 on one side may have a deep groove 26 having a V-shaped cross section, and three positions disposed at equal intervals in the circumferential direction of this deep groove may be used for pressing. Note that these pressing portions 20 to 23 may have various forms shown in FIGS. 2A to 2D in a mutually combined manner, and may have other forms not shown in the drawings.

According to the above constitution, when the shock absorbing type steering shaft is to be manufactured, first the tip end 13 of the large diameter portion 11 of the inner shaft 10 is inserted in the tip end 17 of the small diameter portion 15 of the outer shaft 14, so as to be maintained in an overlapping manner.

Next, a part of the small diameter portion 15 of the outer shaft 14 in which the both tip ends 13 and 17 do not overlap each other is pressed inwardly in the radial direction by means of the pair of pressing members 18 and 19 and is plastically deformed.

In this manner, the part of the small diameter portion 15 which is plastically deformed by means of the tip end side pressing portions 20 and 21 and the part of the small diameter portion 15 which is plastically deformed by the rear side pressing portions 22 and 23 are deformed respectively to have non-circular (flat, elliptic, or the like) cross sections, meanwhile a portion in the middle of these deformed portions is maintained to have a substantially circular cross section.

Figure 3:
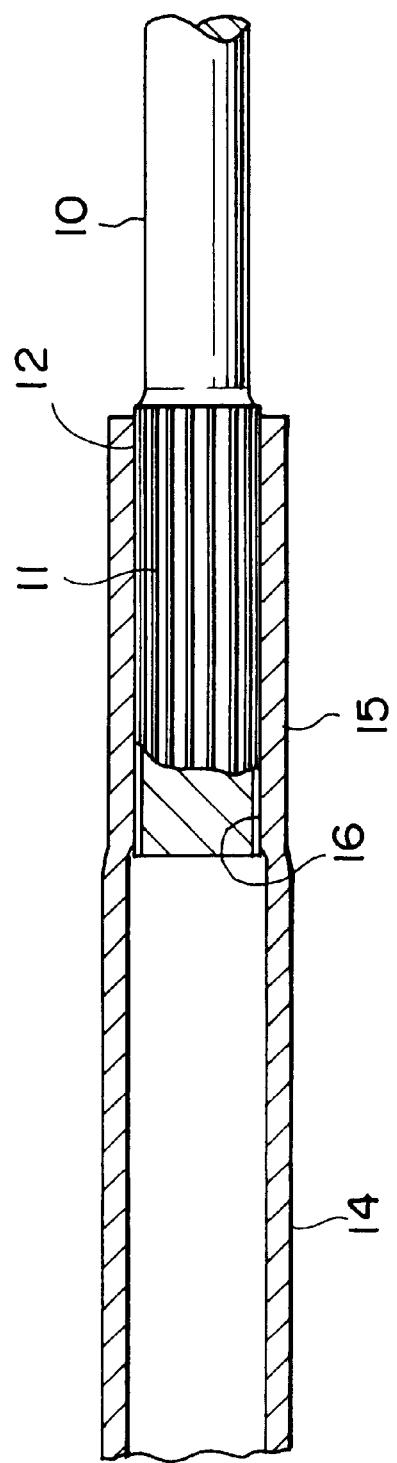
FIG. 3 is a partial cross sectional view of the shock absorbing type steering shaft according to the first embodiment of the present invention.

Subsequently, these pressing members 18 and 19 are removed, and then the large diameter portion 11 of the inner shaft 10 is further inserted (pressure-inserted) in the small diameter portion 15 of the outer shaft 14, so that the large diameter portion 11 is brought into pressure-contact to be fixed to the two parts of the small diameter portion 15 which are plastically deformed to have non-circular cross sections to provide the condition shown in FIG. 3.

Figure 4:
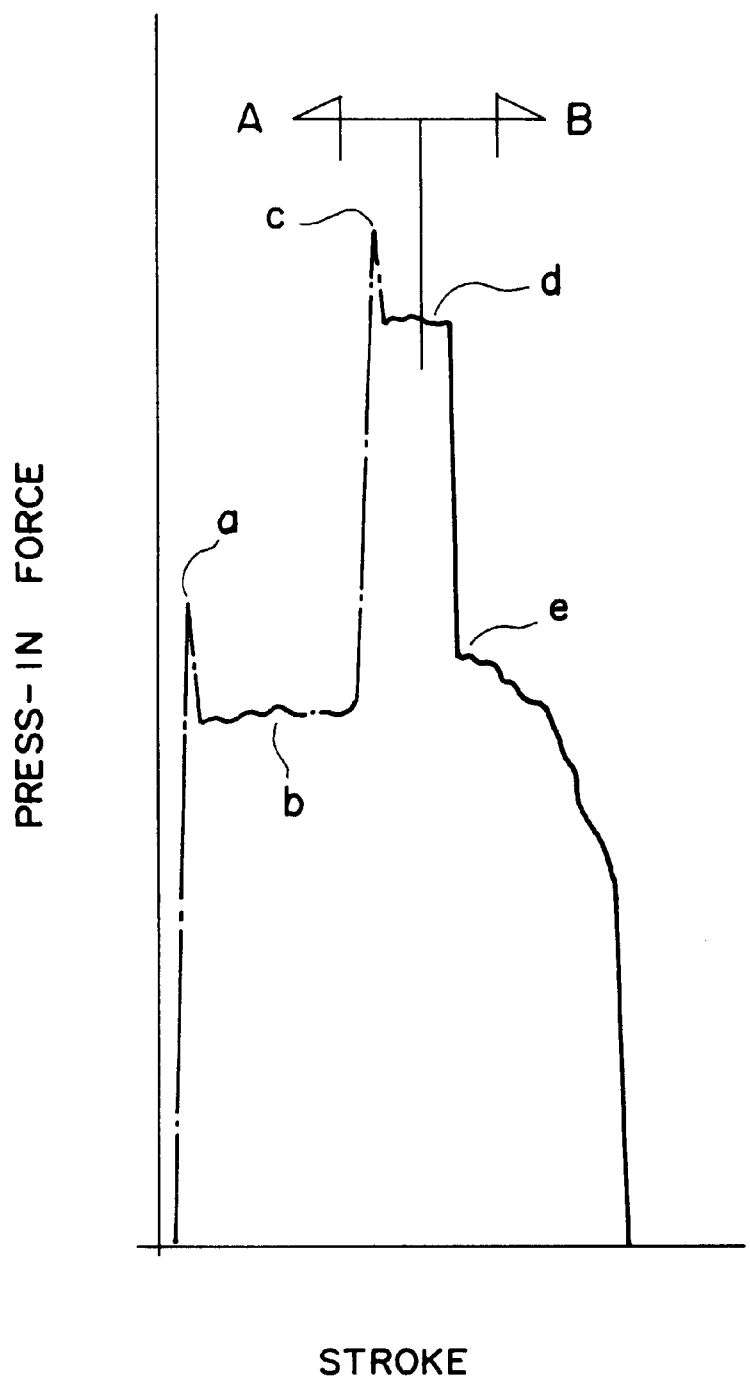
FIG. 4 is a graph for showing a relationship between a press-in force and a stroke when the large diameter portion of the inner shaft is inserted into the small diameter portion of the outer shaft to be brought into pressure contact and fixation, in the shock absorbing type steering shaft according to the first embodiment of the present invention.

Next, FIG. 4 shows a relationship between a stroke and a press-in force for inserting the large diameter portion 11 of the inner shaft 10 into the small diameter portion 15 of the outer shaft 14 to be pressure-contacted and fixed thereto.

Referring to FIG. 4, the area "A" indicated by the virtual line shows a time period from the start of insertion of the inner shaft 10 into the outer shaft 14 to the end of the insertion (completion of the assembling). Meanwhile, the area "B" indicated by the solid line shows the time of collision of the car after the attachment of the shaft to the car.

In the area "A" for showing the assembling process, it may be summarized that the press-in force takes a lower peak value (indicated by the mark a) when the large diameter portion 12 is inserted into the part of the small diameter portion 15 which is plastically deformed by means of the tip end side pressing portions 20 and 21, while the press-in force takes a higher peak value (indicated by the mark c) when the large diameter portion 12 is inserted into the part of the small diameter portion 15 plastically deformed by means of the rear side pressing portions 22 and 23.

The mark b indicates a state in which, after the large diameter 12 is inserted into the part of the small diameter portion 15 which is plastically deformed by means of the tip end side pressing portions 20 and 21, the large diameter portion 12 is fitted in this part of the small diameter portion 15 along a predetermined width. In this state, the press-in force indicate a substantially the same value, lowering from the lower peak value.

Further, the mark d indicates a state of completion of the assembling in which the large diameter portion 12 is fitted in the two parts of the small diameter portion 15 which have been plastically deformed by means of the tip end side pressing portions 20 and 21 and the rear side pressing portions 22 and 23 along a predetermined length. In this state of completion of the assembling, the press-in force indicates a substantially stabilized fixed value, lowering from the higher peak value. This press-in force value acts as a collapse load.

On the other hand, in the area "B" which shows the state after the attachment of the shaft to the car, the collapse load for acting at the time of secondary collision of the car takes a substantially stabilized fixed value indicated by the mark d. More specifically, when the impact load at the time of collision of the car exceeds the press-in force value indicated by the mark d, the both shafts 10 and 14 collapse and are contracted at the two pressure-contacted and fixed parts. According to the present embodiment, this collapse value (the press-in force value indicated by the mark d) is very stable so that scoring phenomenon is difficult to occur.

The press-in force value (the collapse load value) indicated by the mark d or the press-in force value indicated by the mark b can be controlled in various manners by adjusting the pressing force caused by the tip end side pressing portions 20 and 21 and the rear side pressing portions 22 and 23.

Note that the mark e shows the state in which the fitting at the plastically deformed part on the tip end side of the small diameter portion 15 is released after the collapse, and only the fitting at the plastically deformed part on the rear side is maintained.

As described above, in the present embodiment, the collapse value is very stable, which is supposedly caused by the fact that the small diameter portion 15 of the outer shaft 14 is subjected to plastic deformation in a state that tip ends 13 and 17 of the both shafts 10 and 14 slightly overlap each other so that the plastic deforming can be conducted while preventing an excessive deformation of the outer tube 14, whereby the elastic fitting elements can be enhanced (that is, supposedly caused by the fact that two plastically deformed portions of the small diameter portion 15 are not excessively deformed so that there remains a room for further elastic deformation after the plastic deforming process). As a result, when the both shafts are brought into pressure-contact to be fixed to each other, the force of the pressure-contact and fixation can be stably maintained, so as to stabilize the collapse load at the time of collision of the car.

Note that since the press-in force value indicated by the mark d (the collapse load value) is very stable, as described above, it is possible to suppress the lowering of this press-in force value (the collapse load value) to the minimum even when the steering shaft is to be re-assembled.

Also, since the drilling step which was required in the prior art, is unnecessary, it is possible to reduce the manufacturing cost.

Figure 5:
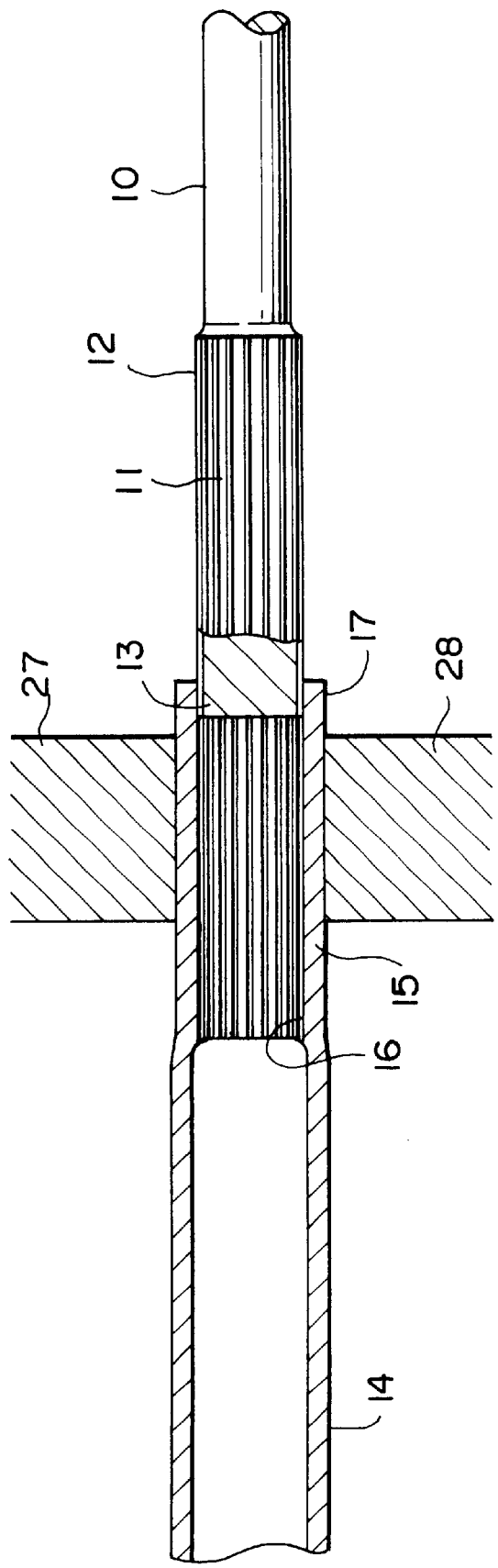
FIG. 5 is a schematic cross sectional view for showing a step of a method for manufacturing a shock absorbing type steering shaft according to the second embodiment of the present invention.

Next, FIG. 5 is a schematic cross sectional view for showing a step of the manufacturing method of a shock absorbing type steering shaft according to a second embodiment of the present invention.

In the second embodiment, there are provided a pair of pressing members 27 and 28, and only one part of the small diameter portion 15 of the outer shaft 14 is subjected to a plastic deforming process. Also in this case, like in the first embodiment, the small diameter portion 15 of the outer shaft 14 is subjected to plastic deformation in a state in which the tip ends 13 and 17 of the both shafts 10 and 14 slightly overlap each other, so that it is possible to conduct the plastic deformation while preventing an excessive deformation of the outer tube 14, thereby stabilizing the collapse load at the time of secondary collision.

Note that the cross sections of these pressing members 27 and 28 may be any of those shown in FIGS. 2A–2D, and may be any forms other than those.

The basic concept of the present invention was described above by way of the first and second embodiments. Description will be further made specifically on a method of manufacturing a shock absorbing type steering shaft which is suitable for a practical use.

In the foregoing embodiments, each corner of the pressing member takes an angular edge-like form. For this reason, the plastic deformation of the outer shaft tends to occur comparatively with sudden. Thus, the scoring easily takes place when the inner shaft is pressure-fitted into the outer shaft, and the surface pressure rises and an apparent fitting load rises, so that the pressurization by the pressing members becomes insufficient and the durability is required to be further enhanced. In addition, even if the apparent press-in load is sufficiently high, an elastic interference in the fitting portion between the outer shaft and the inner shaft is insufficient. Further enhancement of the durability is desired in this point.

The following embodiment is to provide a specific method of manufacturing a shock absorbing type steering shaft which is capable of solving the above-mentioned problems, has a more excellent durability and is more suitable for the practical use.

Figure 7:
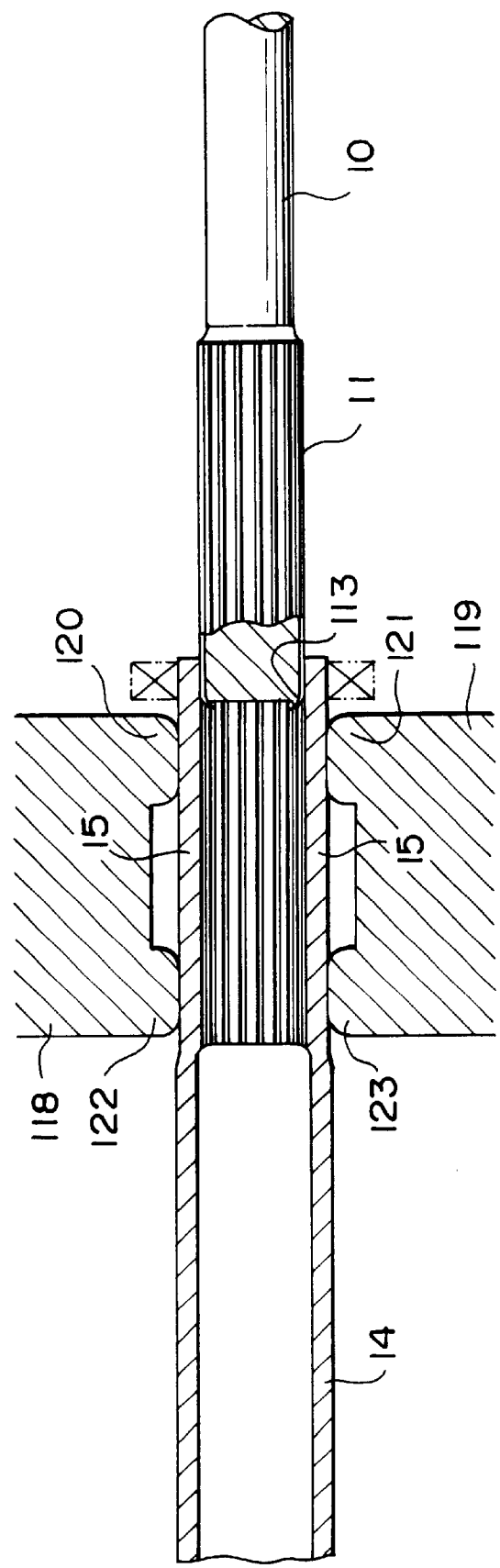
FIG. 7 is a schematic cross sectional view for showing a step of a method for manufacturing a shock absorbing type steering shaft according to the third embodiment of the present invention.

FIG. 7 shows a third embodiment of the present invention which is obtained by improving the above-described first embodiment. In the third embodiment, a pair of pressing members 118 and 119 are provided with two sets of integrally formed pressing portions 120 and 122; and 121 and 123, which are opposed to each other, respectively. In the third embodiment, the corners of each pressing portion are rounded or R-chamfered. Therefore, as described with respect to the first embodiment, when the outer shaft 14 is to be pressed by the pressing members 118 and 119 to be plastically deformed, the form of the portion to be deformed is gradually deformed. As a result, when the tip end 11 of the inner shaft 10 is inserted to be fitted in the small diameter portion 15 of the outer shaft, a pressing load is gradually applied on the inner shaft, thereby giving a sufficient interference.

Further, if the tip end 113 of the inner shaft 10 is slightly corner-sloped or R-chamfered, as shown in FIG. 7, the same effect can be obtained.

Other arrangements of the third embodiment shown in FIG. 7 are the same as those of the first embodiment shown in FIG. 1.

Figure 8:
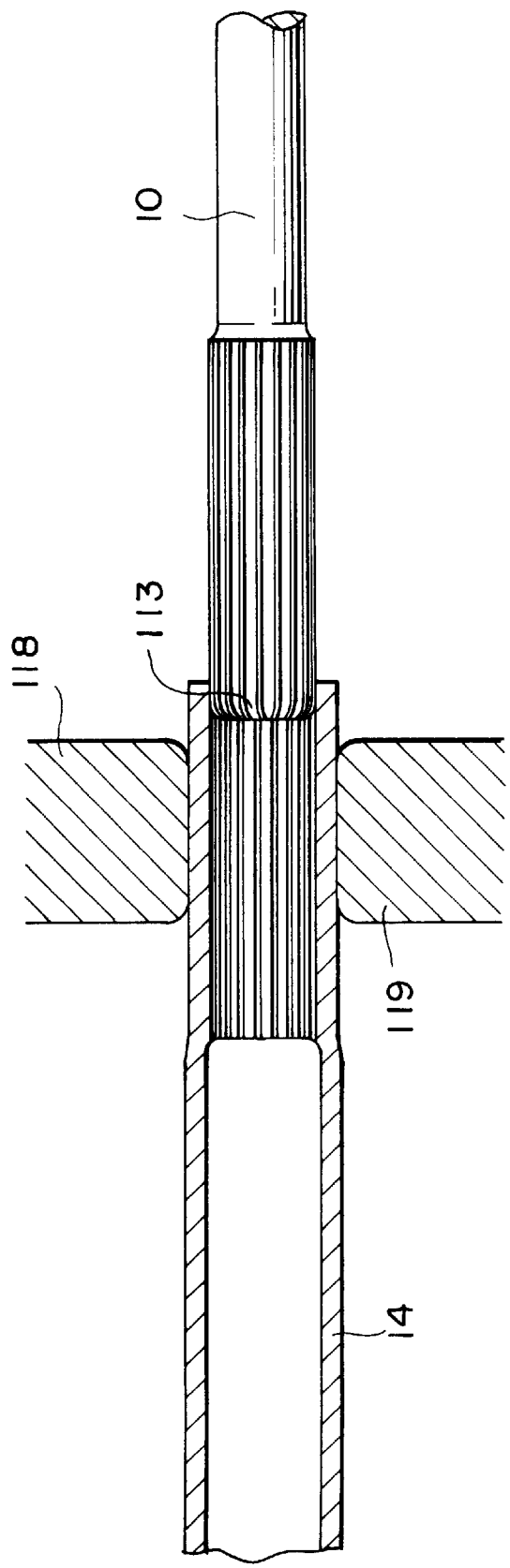
FIG. 8 is a schematic cross sectional view for showing a step of a method for manufacturing a shock absorbing type steering shaft according to the fourth embodiment of the present invention.

FIG. 8 shows a fourth embodiment of the present invention which is obtained by improving the above-described second embodiment. In the fourth embodiment, each of the paired pressing members 118 and 119 is provided with one pressing portion. The two pressing portions respectively provided for the pressing members 118 and 119 are opposed to each other. In the fourth embodiment, the corners of each pressing portion are rounded or R-chamfered. Therefore, as described above with respect to the second embodiment, when the outer shaft is pressed by the pressing members to be plastically deformed, the form of the portion to be deformed is gradually deformed. As a result, the inner shaft is inserted and pressure-fitted in the outer shaft, the load is gradually applied on the inner shaft, whereby a sufficient interference can be allowed.

Further, if the tip end 113 of the inner shaft 10 is slightly corner-sloped or R-chamfered, as shown in FIG. 8, the same effect can be obtained.

Other arrangements of the fourth embodiment shown in FIG. 8 are the same as those of the second embodiment shown in FIG. 5.

Figure 9:
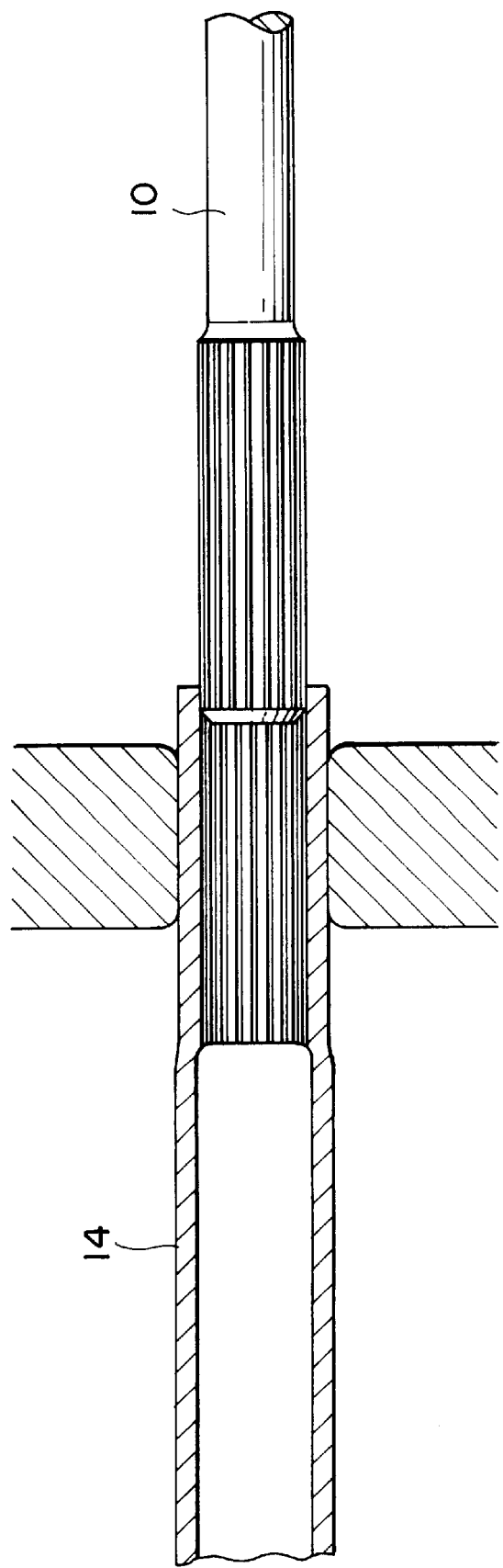
FIG. 9 is a schematic cross sectional view for showing a step of a method for manufacturing a shock absorbing type steering shaft according to a variation of the fourth embodiment of the present invention.

FIG. 9 relates to a variation of the fourth embodiment. In this variation, the tip end of the inner shaft 10 is chamfered. Other arrangements of the variation are the same as those of the embodiment of FIG. 8, and the same effect as that of the third embodiment can be obtained.

Figure 10:
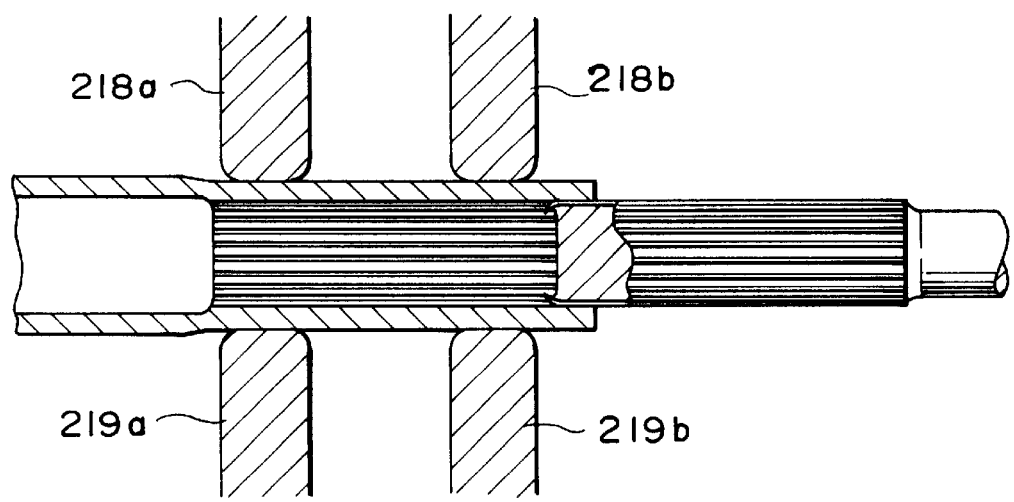
FIG. 10 is a schematic cross sectional view for showing a step of a method for manufacturing a shock absorbing type steering shaft according to the fifth embodiment of the present invention.
Figure 11D:
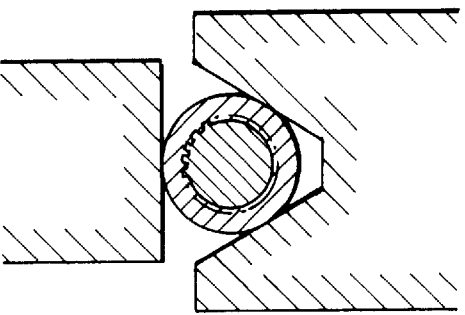
FIGS. 11A to 11D are schematic cross sectional views for showing four pressing portions used in a method for manufacturing a shock absorbing type steering shaft according to the first variation of the fifth embodiment of the present invention.
Figure 11C:
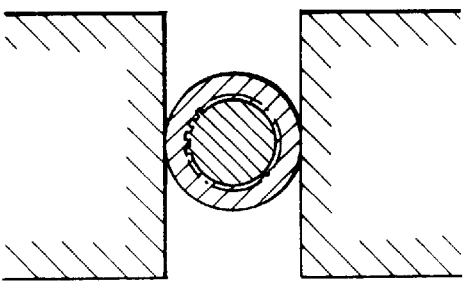
Figure 11B:
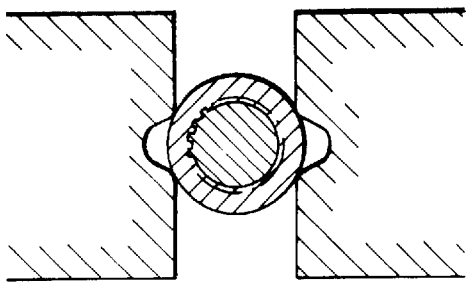
Figure 11A:
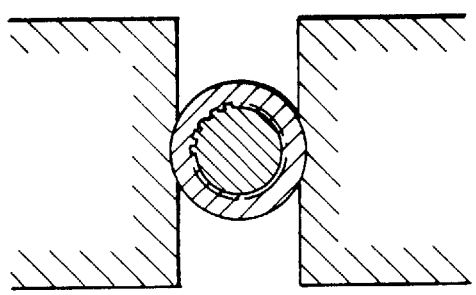
Figure 12A:
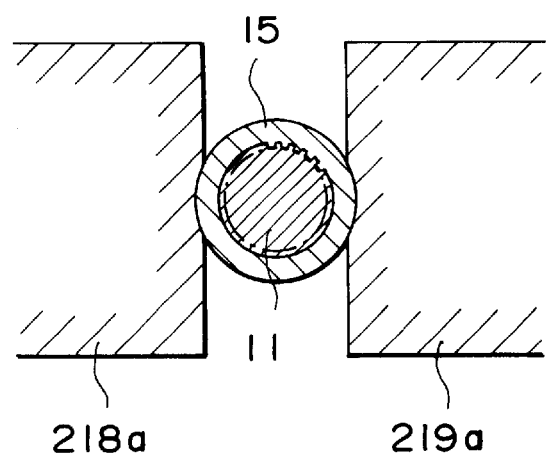
FIGS. 12A, 12B and FIGS. 13A, 13B are schematic cross sectional views for showing two pairs of pressing portions used in a method for manufacturing a shock absorbing type steering shaft according to the second and third variations of the fifth embodiment of the present invention.
Figure 12B:
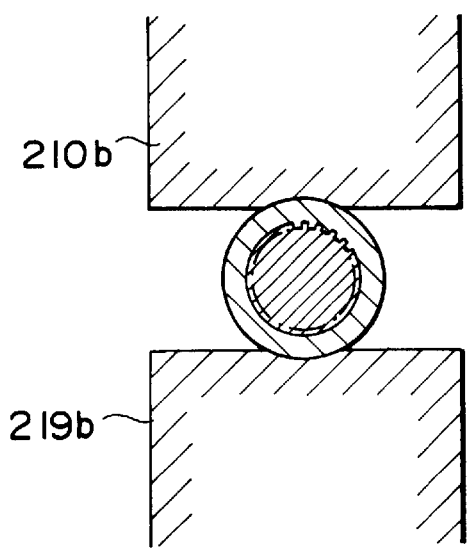
Figure 13A:
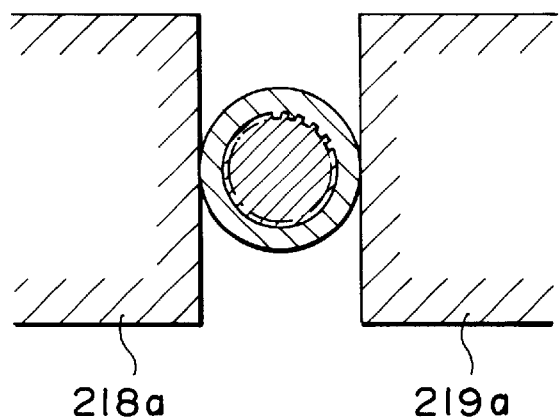
Figure 13B:
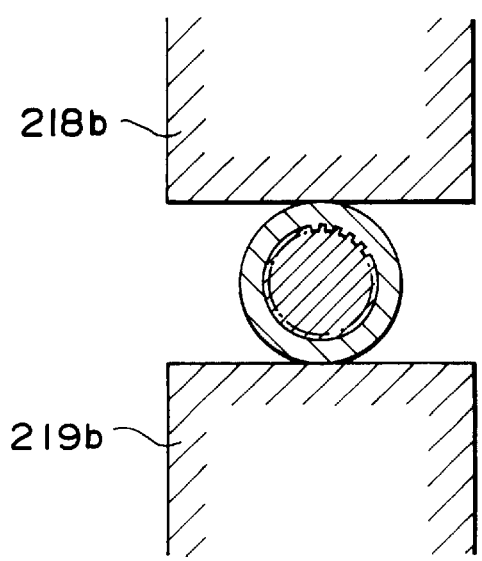

FIG. 10 is a view for explaining the fifth embodiment which is obtained by improving the first embodiment of the present invention. In the fifth embodiment, two sets of pressing members 218a, 218b; and 219a, 219b are separately provided at the two positions in the axial direction. In the fifth embodiment, the forms of the pressing members may be any of those shown in FIGS. 11A to 11D singly or in combination, and may be any other form not illustrated. Note that, of the pressing members in FIG. 11B, the corners of the pressing portions are rounded.

FIGS. 12A, 12B and 13A, 13B respectively relate to second and third variations of the fifth embodiment. In these variations, the pressurizing directions of the two sets of the pressing members 218a, 218b; and 219a, 219b provided at the two positions in the axial direction differ from each other substantially by 90 degrees.

According to the fifth embodiment, it is possible to set an optimal pressing load to be more suitable for the form, the dimensions, the material, the thickness, and the like, of the product, by employing different pressing members in the axial direction. It is also possible to optimally control an interference ratio or a fitting load.

According to the first and second variations of the fifth embodiment shown in FIGS. 12 and 13, it is further possible to effect balance control in the vertical direction and the horizontal direction with respect to the restraining force in the shaft bending direction.

Figure 14:
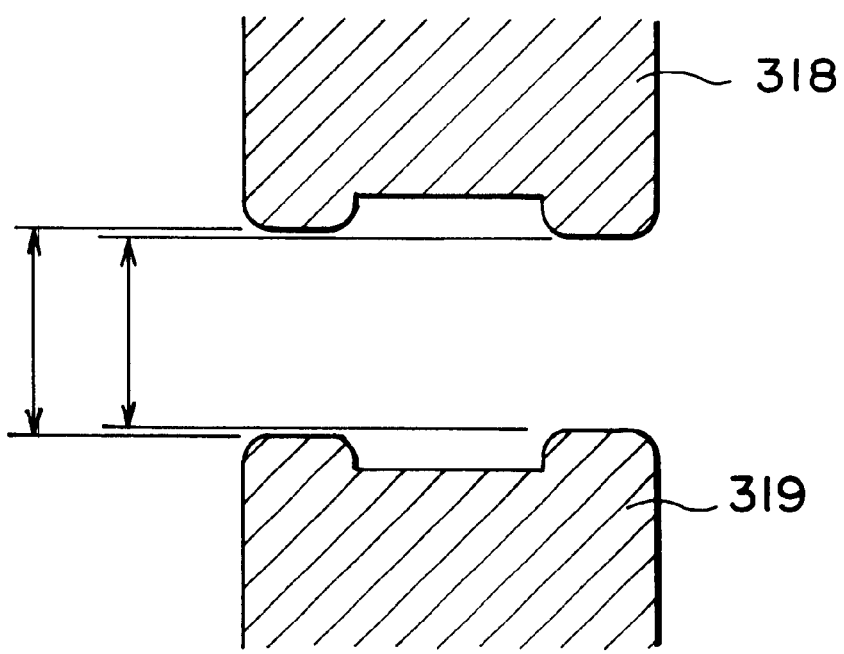
FIG. 14 is a cross sectional view for schematically showing a step of a method for manufacturing a shock absorbing type steering shaft according to the sixth embodiment of the present invention.

FIG. 14 shows a sixth embodiment which is obtained by improving the third embodiment. In the sixth embodiment, a pair of pressing members 318 and 319 are provided with two integrally formed pressing portions, which are opposed to each other, like in the third embodiment. The corners of each pressing portion are R-chamfered or rounded.

In the sixth embodiment, the heights of the two pressing portions are different from each other, and particularly an interference of the deformed portion on the inner side (in the left part in the drawing) of the outer shaft is changed, so as to adjust the press-in load. According to the sixth embodiment, it is possible to desirably adjust the press-in load by thus differentiating the heights of the two pressing portions from each other.

Other arrangement of the sixth embodiment shown in FIG. 14 are the same as those of the third embodiment shown in FIG. 7.

Figure 15:
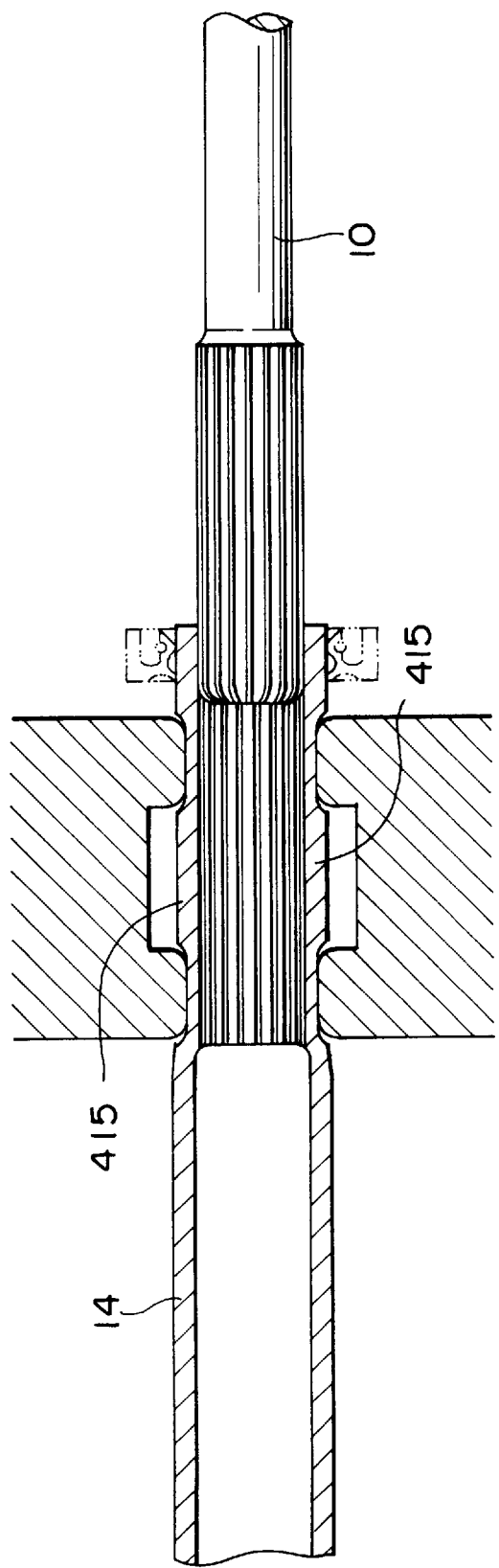
FIG. 15 is a schematic cross sectional view for showing a step of a method for manufacturing a shock absorbing type steering shaft according to the seventh embodiment of the present invention.

FIG. 15 shows a seventh embodiment of the present invention. In the seventh embodiment, a pair of pressing members take the same forms as those in the third embodiment.

Further, in the seventh embodiment, a force for maintaining the elasticity between the deformed portion and an interference fitting portion of the inner shaft is adjusted by locally changing the thickness of a portion 415 to be deformed of the outer shaft 14.

Figure 16:
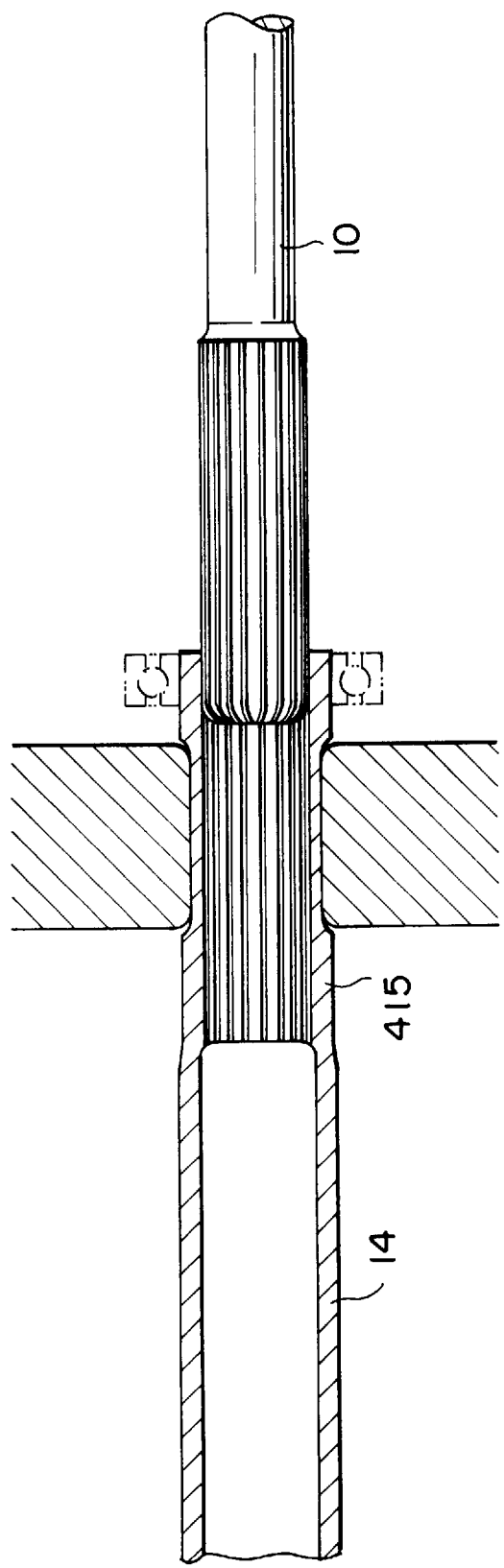
FIG. 16 is a schematic cross sectional view for showing a step of a method for manufacturing a shock absorbing type steering shaft according to the eighth embodiment of the present invention.

FIG. 16 shows an eighth embodiment of the present invention. In the eighth embodiment, a pair of pressing members take the same forms as those in the fourth embodiment.

Further, in the eighth embodiment, the thickness of a portion to be deformed of the outer shaft 14 is changed locally, like in the seventh embodiment, thereby a force for maintaining the elasticity between the deformed portion of the inner shaft and an interference fitted portion of the inner shaft being adjusted.

Next, a ninth embodiment (not shown) of the present invention will be described. In case of the ninth embodiment, portions to be pressure-fitted of the outer shaft and/or the inner shaft are subjected to a surface treatment. With this surface treatment, a metallic soap, a plating, or the like, is interposed between the pressure-fitted portions, so that the scoring does not easily occur and a coefficient of friction is lowered. Consequently, the same effect as that described with respect to the third and fourth embodiments can be obtained.

A tenth embodiment (not shown) of the present invention will be described. In case of the tenth embodiment, serration portions of portions to be pressure fitted of the outer shaft and/or the inner shaft are subjected to a plastic processing. With this plastic processing, the surfaces to be pressure-fitted become plastically processed surfaces, so that the surface roughness thereof is enhanced and a coefficient of friction which is obtained from the plastically processed surface is lowered. As a result, the same effect as that described with respect to the third and fourth embodiments can be obtained.

An eleventh embodiment (not shown) of the present invention will be described in the following. In case of the eleventh embodiment, the hardness of a portion to be pressure-fitted of the inner shaft is set to be higher than that of the outer shaft by 30 points or more in the Vickers hardness. Thus, scoring is hardly generated when the inner shaft is pressure-fitted in the outer shaft, and the fitting load can be suppressed to be comparatively low.

The pressing members used in the ninth to eleventh embodiments may be any of those used in the first to eighth embodiments.

Figure 17:
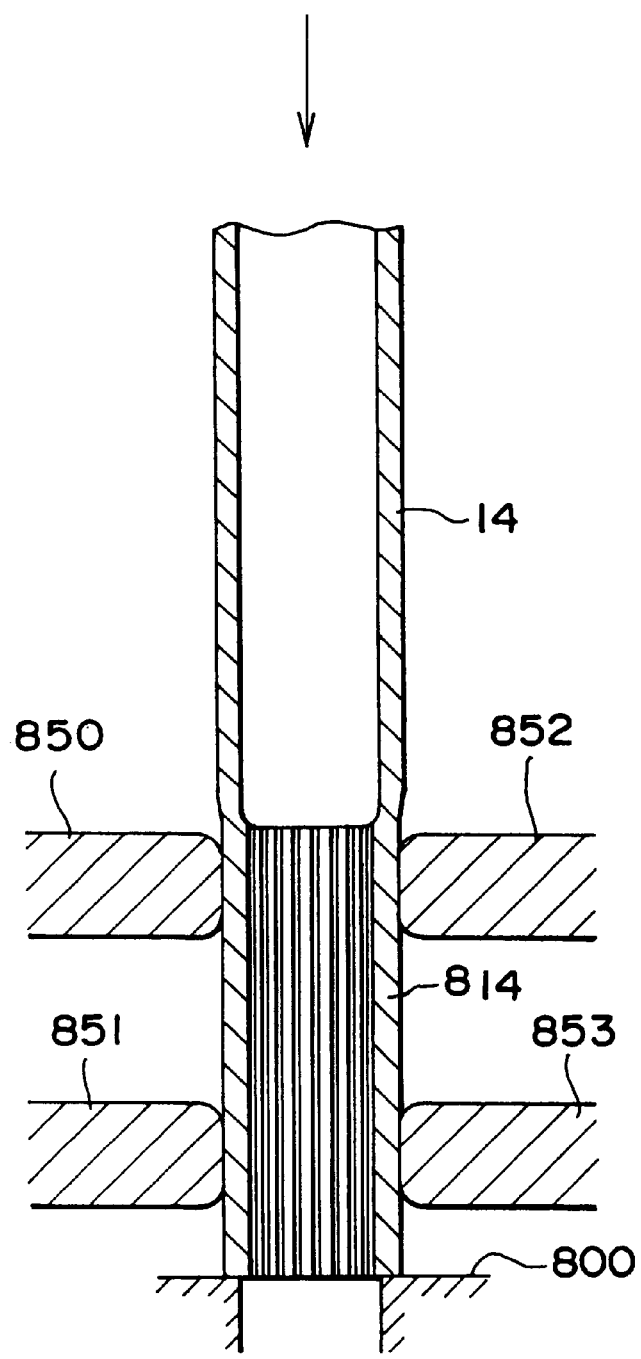
FIG. 17 is a schematic cross sectional view for showing a step of a method for manufacturing a shock absorbing type steering shaft according to the twelfth embodiment of the present invention.
Figure 18:
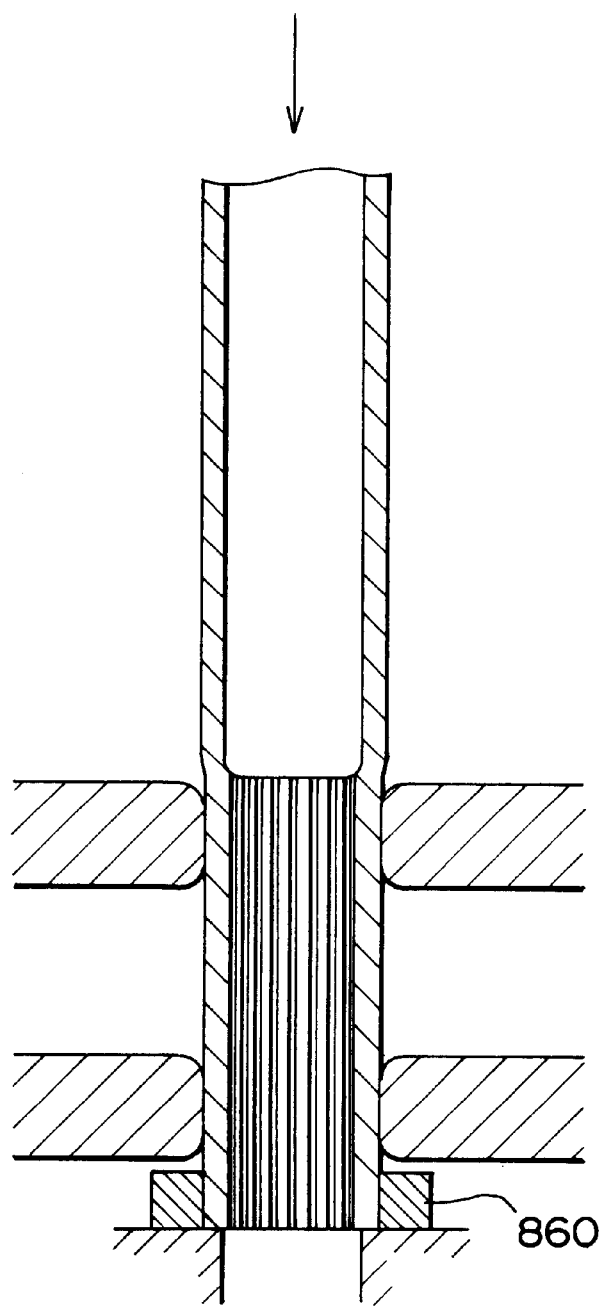
FIG. 18 is a schematic cross sectional view for showing a step of a method for manufacturing the shock absorbing type steering shaft according to the twelfth embodiment of the present invention.
Figure 19:
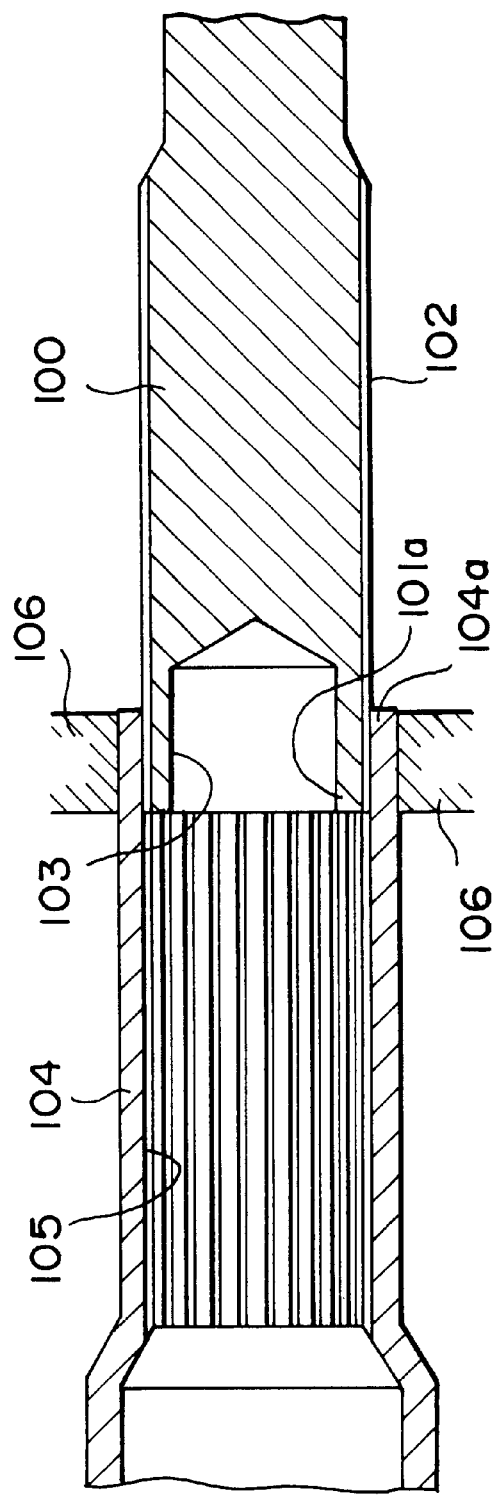
FIG. 19 is a schematic cross sectional view for showing a step of a method for manufacturing a shock absorbing type steering shaft according to the prior art.

FIG. 17 shows a twelfth embodiment of the present invention. In the twelfth embodiment, unlike in any of the foregoing embodiments, a portion 814 desired to be deformed is locally pressed by pressing members 850 to 853 when a female serration portion is formed on the outer shaft 14. The pressurization is released upon completion of the formation of the serration, thereby completing an elliptic serration portion. It is possible to obtain a shock absorbing type steering shaft having a sufficient fitting force without backlash, like in any of the foregoing embodiments, by pressure-fitting an inner shaft having a male serration of a true circular form in this serration portion. Also, as shown in FIG. 18, if a ring 860 for preventing deformation is provided when forming a serration, a true circular outer periphery can be formed on a desired portion at which seals or bearings can be provided easily and securely. Note that in FIG. 17, a reference numeral 800 denotes a supporting table, and the arrow indicates an advancing direction of a broaching tool for serration.

According to the twelfth embodiment, the arrangement simply is that the inner shaft is pressure-fitted in the outer shaft, so that the processing cost can be reduced.

Note that the present invention is not limited to the foregoing embodiments, but allows a large number of variations.

As described above, when the outer shaft and the inner shaft are brought into pressure-contact and fixed to each other, it is possible to stably maintain this force of pressure-contact and fixation, thereby stabilizing the collapse load which acts upon the secondary collision. It is also possible to reduce the manufacturing cost since the drilling step is unnecessary, unlike in the conventional example.

What is claimed is:

1. A method for manufacturing a shock absorbing type steering shaft for fitting and fixing a solid inner shaft member having a male serration in a tubular outer shaft member having a complementary female serration, comprising:

inserting into a hollow tip end portion of the tubular outer shaft member a solid tip end portion of the inner shaft member that fills the hollow tip end portion of the tubular outer shaft member so that the inner shaft member is held by and overlaps with the outer shaft member at the tip end portions thereof;

pressing radially inwardly the outer shaft member, at a position or positions thereof displaced from the overlapping tip end portions, by means of pressing members to deform plastically an inner portion or portions of the outer shaft member;

removing the pressing members; and further inserting the inner shaft member into the outer shaft member, thereby pressure-contacting and fixing the inner shaft member to a portion or portions of the outer shaft member deformed plastically by the pressing members.

* * * * *